Patented May 15, 1951

2,552,508

UNITED STATES PATENT OFFICE 2,552,508

CATALYTIC POLYMERIZATION OF α OLEFINS

Edwin F. Peters, Chicago, Ill., assignor to Standard Oil Company, Chicago, Ill., a corporation of Indiana No Drawing. Application December 15, 1948, Serial No. 65,503

12 Claims. (Cl. 260—683.15)

This invention relates to a process for the polymerization of alpha-olefins. More particularly it relates to a process for the production of dimers and trimers in substantial yields from tertiary alpha-olefins by polymerization in the presence of a boron trifluoride catalyst.

I have observed that in the $BF_3$-catalyzed polymerization of beta-olefins or other olefins in which the double bond is positioned even more deeply within the olefin molecule, it is readily possible to control the operating variables to yield principally dimers and trimers derived from the olefin monomer. It appears that the polymerization of olefins other than alpha-olefins yields dimers having, at most, one hydrogen atom bound to a carbon atom bearing the olefinic double bond; consequently, said dimers do not readily polymerize further to yield higher molecular weight polymers, for example, tetramers, pentamers, hexamers and the like. Thus, olefins such as 2-butene, 2-pentene, 2-methyl-2-butene and the like can be readily dimerized and trimerized in high yields in the presence of a catalyst consisting essentially of $BF_3$ by suitable correlation and control of the polymerization reaction conditions.

However, alpha-olefins (1-olefins) and particularly tertiary alpha-olefins, such as isobutylene, can be readily polymerized by catalysts consisting essentially of $BF_3$ to yield polymers comprising predominantly tetramers, pentamers, hexamers and higher molecular weight constituents and only relatively minor proportions of dimers and trimers. It has heretofore been proposed to polymerize isobutylene to produce principally an isobutylene trimer by treatment in the gaseous phase with small proportions of $BF_3$ and reaction periods below one second. In said gas phase isobutylene polymerization process it has been proposed to effect the necessary limitation on contact time between $BF_3$ and isobutylene by inactivating the $BF_3$ with steam, water, ammonia or the like. The disadvantages of the gas phase polymerization process are: (1) employment of the olefin and catalyst in the vapor phase requires considerably larger reaction equipment than liquid phase polymerization processes, (2) the yield of dimer is low, (3) it is necessary to destroy the relatively expensive $BF_3$ catalyst by reaction with water, alkalies or the like.

It is an object of this invention to provide a process for the polymerization of alpha-olefins to produce principally polymers of a low degree of polymerization. Another object is to provide a process for the polymerization of tertiary alpha-olefins to produce principally low molecular weight polymers such as dimers and trimers while substantially avoiding the formation of high molecular weight polymers such as tetramers, pentamers and the like. An additional object of this invention is to provide means for modulating the activity of polymerization catalysts comprising essentially $BF_3$. Still another object of this invention is to provide a process for the simultaneous oxidation and polymerization of alpha-olefins, particularly tertiary alpha-olefins such as isobutylene. A further object of this invention is to provide a process for the polymerization of olefins such as isobutylene in the presence of a catalyst consisting essentially of $BF_3$ to produce substantial yields of dimers and trimers. Yet another object of this invention is to provide a process for the partial oxidation of tertiary alpha-olefins such as isobutylene in the presence of a catalyst consisting essentially of $BF_3$. These and other objects of this invention will become apparent from the ensuing description thereof.

I have found that alpha-olefins, particularly tertiary alpha-olefins such as isobutylene, can be polymerized in the liquid phase in the presence of boron fluoride catalysts to produce principally dimers and trimers by the addition of oxygen or an oxygen-containing gas, in certain amounts hereinafter defined, to the polymerization reaction zone. I have found that oxygen acts not merely as a catalyst to control the degree of polymerization of the olefin monomer, but also enters into the reaction to yield oxidation products, as well be more fully set forth hereinafter.

Although my invention may be practiced upon alpha-olefins such as 1-butene, 1-pentene, 3-methyl-1-butene, 1-hexene and the like, the preferred application of the invention is to tertiary alpha-olefins. Tertiary alpha-olefins have the generic formula

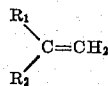

wherein $R_1$ and $R_2$ are hydrocarbon radicals, preferably alkyl or cycloalkyl radicals. Examples of tertiary alpha-olefins suitable for employment in the process of my invention include isobutylene, 2-methyl-1-butene, 2-cyclohexyl propene, 2-cyclohexyl-1-butene, isopropenyl benzene and the like. The process of this invention is not restricted to the use of pure olefins; and olefinic hydrocarbon fractions containing saturated hydrocarbons, particularly paraffinic hydrocarbons, e. g., such as are normally produced in petroleum refinery operations, may be employed in my process. It will also be apparent that the process of this invention can be effected upon mixtures of olefins to produce relatively low molecular weight polymers or copolymers.

The catalyst employed in the process of my invention consists essentially of BF₃. In the operation of my process I have found it unnecessary, in general, to carefully dehydrate the olefinic charging stock and it is apparent that in my process small amounts of water of the order of about 0.01 to about 1.0 percent can safely be tolerated. Likewise, small amounts of HF of the order of about 0.01 to about 1 or 2 percent by weight based on the olefinic reactant can be included with BF₃ in the operation of the polymerization of this invention.

The polymerization process of my invention is effected in the presence of oxygen or oxygen-containing gases such as air, oxygen-enriched air, ozone and the like. It should be understood that the process of my invention is not restricted to any particular source of oxygen; commercial oxygen, or oxygen generated in situ can be employed for the purposes of my invention.

In general, alpha-olefins, particularly tertiary alpha-olefins such as isobutylene, can be polymerized to yield predominantly dimers and trimers by contacting said olefins in the liquid phase with a catalyst consisting essentially of BF₃ in an amount between about 0.05 and about 30 percent by weight or even more, based on said olefins and with oxygen in an amount between about 5 and about 40 percent by weight, based on said olefin at a temperature between about 70° F. and about 250° F. In the preferred method of operating the process of my invention to make primarily polymer with no more than minor amounts of oxygen compounds, I can use BF₃ in amounts between about 0.1 and about 5 weight percent and oxygen in amounts between about 10 and about 25 weight percent, based upon the olefin monomer, at temperatures between about 75° F. and about 150° F., under pressure sufficient to maintain a substantial liquid phase of olefin monomer within the reaction zone. It will be apparent that one of the advantages of the process of this invention is that the BF₃:olefin feed ratio need not be closely controlled in order to secure substantial yields of olefin dimers and trimers. If desired, the polymerization reaction may be effected in the presence of inert solvents or diluents, particularly non-tertiary saturated hydrocarbons such as propane, n-butane, n-pentane, acid-treated straight-run petroleum naphthas and the like.

The polymerization process of this invention will be illustrated by reference to the following table. In carrying out the tabulated examples, an autoclave equipped with a 1725 R. P. M. stirrer, capable of operating at pressures up to 1500 p. s. i. g., was employed. The lower end of the reactor was connected through a pressure reducing valve to a copper accumulating drum which served to receive the polymer and BF₃-complex formed in the course of reaction. The upper portion of the accumulating drum was, in turn, connected to a soda lime tower which was in turn connected to a Dry Ice condenser.

In performing the examples, the usual procedure was to charge the indicated amount of BF₃ gas and oxygen into the reactor, then to add the propane diluent to the reactor and to bring the reactor contents to the reaction temperature while stirring. Upon reaching the reaction temperature, further heating of the reactor contents was discontinued and the olefin was passed into the reactor at a predetermined rate while heating or cooling the reactor, if necessary, to maintain the desired, substantially constant polymerization reaction temperature. Upon completion of the addition of the olefin to the reactor, the reactor contents were usually stirred for an additional 15 minutes. The reactor contents were then discharged by flashing through the pressure reducing valve to the copper accumulating drum. When propane was employed as a reaction solvent and diluent, I have observed that the flashing of propane cools the polymer in the reaction mixture sufficiently so that most of the light polymer remains with heavier polymer in the copper drum. Unreacted olefin, oxygen, volatile diluent and some of the fluoride catalyst were passed in the vapor or gaseous state from the copper accumulating drum through the soda lime tower, wherein acidic vapors were removed and the condensables (diluent and unconverted olefin) were condensed in the Dry Ice-acetone condenser and collected in a flask packed in dry ice. Non-condensable gases passing overhead from the condenser were metered through a wet test meter.

In the copper accumulating drum, the olefin polymer formed an upper layer which was insoluble in a lower layer of catalyst complex (BF₃-oxygenated compounds). Polymer was decanted from the catalyst complex, passed through a tower of attapulgus clay and then subjected to fractional distillation in a wire gauze-packed fractionating column to produce dimer, trimer, tetramer and heavier polymer fractions.

*Table*

| Example Number | 1 | 2 | 3 | 4 | 5 | 6 | 7 |
|---|---|---|---|---|---|---|---|
| Charge, grams: | | | | | | | |
| BF₃ | 40 | 40 | 4 | 5 | ² 1 | 35 | 17 |
| Oxygen | ¹ 4 | | | | | 40 | 75 |
| Isobutylene | 864 | 675 | 826 | | | 109 | 465 |
| 2-Methyl-2-butene | | | | 1,168 | 983 | | |
| Propane | 103 | 103 | 830 | | | | |
| Experimental conditions: | | | | | | | |
| Temp., °F | 98 | 65 | 150 | 115 | 79 | 85 | 100 |
| Pres. gage, p. s. i. g | 300 | 200 | 75 | 30 | 50-0 | 270 | 550 |
| Contact time, Min | 100 | 150 | 35 | 85 | 2,595 | 35 | 150 |
| Wt. Per Cent BF₃, based on olefin | 4.6 | 5.9 | 0.5 | 0.4 | 0.1 | 32 | 3.7 |
| Wt. Per Cent oxygen, based on iC₄ | 0.09 | 0 | 0 | 0 | 0 | 37 | 16 |
| Polymer Composition, Wt. Per Cent: | | | | | | | |
| Dimer | 1 | 2 | 4 | 58 | 84 | 14 | 21 |
| Trimer | 22 | 17 | 34 | 30 | 11 | 72 | 63 |
| Tetramer | 36 | 30 | 22 | 12 | 5 | 13 | 10 |
| Pentamer | 15 | 11 | 11 | | | 1 | 6 |
| Hexamer and Higher | 26 | 40 | 29 | | | | |
| Total | 100 | 100 | 100 | 100 | 100 | 100 | 100 |
| Conversion, Wt. Per Cent | 100 | 100 | 100 | 98 | 70 | 100 | 100 |
| Wt. Per Cent O₂ Consumption | | | | | | 50 | 20 |
| Wt. of Complex, g | | | | | | 16 | 28 |
| Complex Composition, Wt. Per Cent: | | | | | | | |
| Oxygen-containing compounds | | | | | | 30 | |
| Hydrocarbons | | | | | | 10 | |
| Bottoms | | | | | | 60 | |

¹ Air.
² Catalyst added rapidly to the reactor full of olefin without stirring.

It will be noted from Examples 1, 2 and 3 that the liquid phase polymerization of isobutylene in the absence of substantial amounts of oxygen resulted in quantitative conversion of the isobutylene monomer to various polymers, but the yield of dimer was quite inconsequential and the yields of isobutylene trimer were rather low. It will be apparent that in the absence of oxygen, the BF₃-catalyzed polymerization of isobutylene leads principally to the production of isobutylene tetramers, pentamers, hexamers and higher molecular weight polymers.

Examples 4 and 5 illustrate the polymerization behavior of 2-methyl-2-butene under similar conditions. The principal structural difference between isobutylene and 2-methyl-2-butene is that the former is an alpha-olefin whereas the latter is a beta-olefin. It will be noted from Examples 4 and 5 that 2-methyl-2-butene can be readily polymerized to yield almost wholly a mixture of dimer and trimer in the substantial absence of oxygen.

In Examples 6 and 7 wherein oxygen was present in the polymerization reaction zone in accordance with the invention, it will be noted that a markedly different product distribution was obtained as compared with the distribution in Examples 1 to 3. It will be noted from Examples 6 and 7 that the presence of oxygen did not decrease the conversion of isobutylene but that substantial yields of dimer and especially trimer were obtained, whereas only a low yield of tetramer and a relatively insignificant yield of pentamers and higher polymers were produced. The oxygen consumption in Examples 6 and 7 appeared to be primarily related to the oxygen concentration in the reaction zone. The oxygen-containing compounds derived from the complex of $BF_3$-oxygenated compounds were subjected to various characterizing analytical procedures and shown to contain aldehydes, alcohols and carboxylic acids. A small amount of oxygenated compounds was extracted from the isobutylene polymer produced by washing with water and the resultant aqueous solution gave characteristic reactions for aldehydes, alcohols and carboxylic acids. In carrying out Examples 6 and 7 it was noted that smooth and rapid oxygen absorption occurred.

Although certain illustrative embodiments of the process of my invention have been set forth above, it will be apparent that the process of my invention is capable of considerable variation. Thus, the oxygen employed in my process may be diluted with nitrogen (as in air or otherwise), or other inert gas to minimize the possibility of uncontrolled oxidation of the olefin charging stock or the dangers of explosion. The $BF_3$-oxygenated compound complex produced in my process can be separated from the olefin polymers by settling, centrifuging or the like and may be treated by suitable procedures to recover $BF_3$ and oxygenated compounds, respectively, therefrom. Thus, the $BF_3$ complex may be subjected to a temperature between about 70° F. and about 350° F. and a pressure of one atmosphere or less to volatilize $BF_3$ therefrom; the $BF_3$ thus regenerated from the complex may be employed in effecting further polymerization of olefin charging stock. Alternatively, where the recovery of $BF_3$ is not desired, the $BF_3$-oxygenated compound complex layer derived from the olefin polymerization reaction zone may be subjected to hydrolysis or neutralization, and water-insoluble products, principally oxygenated compounds, can be decanted from the resultant aqueous layer. In another mode of operation the catalyst complex may be treated with various solid materials capable of preferentially adsorbing $BF_3$ or reacting therewith, e. g., KF, NaF, KOH, NaOH, soda lime, alumina, clays or the like.

The relatively low molecular weight polymers produced by the process of my invention are capable of varied applications. Thus, using the isobutylene dimers and trimers as examples, the polymers produced by the present invention can be catalytically hydrogenated to produce high octane number aviation gasoline and safety fuel components; they may be treated with hydrogen chloride or other hydrogen halides to produce isoalkyl halides which in turn may be hydrolyzed to the corresponding alcohols or employed for the alkylation of aromatic hydrocarbons in the presence of Friedel-Crafts catalysts. The olefin polymers may be employed directly for the alkylation of aromatic hydrocarbons such as benzene, toluene, xylenes and the like in the presence of acidic condensation catalysts to produce alkymers which can be sulfonated to yield high quality alkyl aromatic sulfonate detergents; they may be treated with carbon monoxide and hydrogen in the presence of cobalt catalysts (the so-called OXO process) to produce aldehydes, alcohols and carboxylic acids containing one more carbon atom than the olefin charging stock. These and numerous other uses are available and will readily suggest themselves to those skilled in the art.

Having thus described my invention, what I claim is:

1. A process for the polymerization of an alpha-olefin to produce principally dimers and trimers, which process comprises contacting said olefin in the liquid phase with a catalyst consisting essentially of $BF_3$ in an amount between about 0.05 and about 30 percent by weight and with oxygen in an amount between about 5 and about 40 percent by weight, based on said olefin, at a temperature between about 70° F. and about 250° F. for a period of time sufficient to effect substantial polymerization of said olefin.

2. A process for the polymerization of a tertiary alpha-olefin to produce principally dimers and trimers, which process comprises contacting said olefin in the liquid phase with a catalyst consisting essentially of $BF_3$ in an amount between about 0.05 and about 30 percent by weight and with oxygen in an amount between about 5 and about 40 percent by weight, based on said olefin, at a temperature between about 70° F. and about 250° F. for a period of time sufficient to effect substantial polymerization of said olefin.

3. The process of claim 2 wherein the olefin is isobutylene.

4. The process of claim 2 wherein the polymerization is conducted at a temperature between about 75° F. and about 150° F.

5. The process of claim 4 wherein the oxygen concentration is between about 10 and about 25 percent by weight, based on the olefin charging stock.

6. A process for the polymerization of isobutylene to produce principally dimers and trimers, which process comprises contacting isobutylene in the liquid phase with a catalyst consisting essentially of $BF_3$ in an amount between about 0.05 and about 30 percent by weight and with oxygen in an amount between about 10 and about 25 percent by weight, based on said isobutylene, at a temperature between about 75° F. and about 150° F., for a period of time sufficient to effect substantial polymerization of said isobutylene.

7. A process for the polymerization of a tertiary alpha-olefin to produce principally dimers and trimers, which process comprises contacting said olefin in the liquid phase with a catalyst consisting essentially of $BF_3$ in an amount between about 0.1 and about 5 percent by weight and with oxygen in an amount between about 10 and about 25 percent by weight, based on said olefin, at a temperature between about 75 and about 150° F., for a period of time sufficient to effect substantial polymerization of said olefin.

8. The process of claim 7 wherein the olefin is isobutylene.

9. A process for the polymerization of an alpha-olefin to produce principally dimers and trimers, which process comprises contacting said olefin in a polymerization zone in the liquid phase with a catalyst consisting essentially of $BF_3$ in an amount between about 0.05 and about 30 percent by weight and with oxygen in an amount between about 5 and about 40 percent by weight, based on said olefin, at a temperature between about 70° F. and about 250° F. for a period of time sufficient to effect substantial polymerization of said olefin, separating liquid polymerization reaction products and a normally liquid catalyst layer, respectively, from the resultant reaction products, separating oxygenated organic compounds and $BF_3$ from said liquid catalyst layer, and recycling said $BF_3$ to said polymerization zone.

10. The process of claim 9 wherein the olefin is isobutylene.

11. A process for the polymerization of an alpha-olefin to produce principally dimers and trimers, which process comprises contacting said olefin in a polymerization zone in the liquid phase with a catalyst consisting essentially of $BF_3$ in an amount between about 0.05 and about 30 percent by weight and with oxygen in an amount between about 5 and about 40 percent by weight, based on said olefin, at a temperature between about 70° F. and about 250° F. for a period of time sufficient to effect substantial polymerization of said olefin, separating liquid polymerization reaction products and a normally liquid catalyst layer, respectively, from the resultant reaction products, subjecting said liquid catalyst layer to an elevated temperature sufficient to regenerate $BF_3$ therefrom and recycling regenerated $BF_3$ to said polymerization zone.

12. The process of claim 11 wherein the olefin is isobutylene.

EDWIN F. PETERS.

REFERENCES CITED

The following references are of record in the file of this patent:

UNITED STATES PATENTS

| Number | Name | Date |
| --- | --- | --- |
| 2,341,286 | Pines et al. | Feb. 8, 1944 |
| 2,379,656 | Ruthruff | July 3, 1945 |
| 2,397,146 | Kellog et al. | Mar. 26, 1946 |